United States Patent
Wang et al.

(10) Patent No.: US 12,223,171 B2
(45) Date of Patent: Feb. 11, 2025

(54) METADATA PROCESSING METHOD TO IMPROVE DATA READ/WRITE EFFICIENCY OF A STORAGE DEVICE

(71) Applicant: Huawei Technologies Co., Ltd., Shenzhen (CN)

(72) Inventors: Chen Wang, Shenzhen (CN); Meng Gao, Shenzhen (CN); Wenlin Cui, Chengdu (CN); Siwei Luo, Chengdu (CN); Ren Ren, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 18/064,060

(22) Filed: Dec. 9, 2022

(65) Prior Publication Data

US 2023/0105067 A1 Apr. 6, 2023

Related U.S. Application Data

(63) Continuation of application No. PCT/CN2021/094646, filed on May 19, 2021.

(30) Foreign Application Priority Data

Jun. 11, 2020 (CN) .......................... 202010526832.2
Jul. 28, 2020 (CN) .......................... 202010739813.8

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 2209/509
See application file for complete search history.

(56) References Cited

U.S. PATENT DOCUMENTS

| | | |
|---|---|---|
| 2005/0122980 A1 | 6/2005 | Anand et al. |
| 2006/0095754 A1* | 5/2006 | Hyder .................. G06F 13/128 713/1 |
| 2012/0198030 A1 | 8/2012 | Wang et al. |
| 2015/0052280 A1 | 2/2015 | Lawson |
| 2016/0124880 A1 | 5/2016 | Goren et al. |
| 2016/0170903 A1* | 6/2016 | Kanno ................ G06F 12/0246 711/103 |
| 2016/0294983 A1 | 10/2016 | Kliteynik et al. |
| 2018/0157445 A1 | 6/2018 | Gissin et al. |

(Continued)

FOREIGN PATENT DOCUMENTS

| | | |
|---|---|---|
| CN | 107003943 A | 8/2017 |
| CN | 107077426 A | 8/2017 |

(Continued)

*Primary Examiner* — Jane W Benner
(74) *Attorney, Agent, or Firm* — Conley Rose, P.C.

(57) ABSTRACT

A metadata processing method includes a network interface card in a storage device that receives an input/output (I/O) request, where the I/O request includes a data read request or a data write request; the network interface card executes a metadata processing task corresponding to the I/O request; and when determining that the metadata processing task fails to be executed, the network interface card requests a CPU in the storage device to execute the metadata processing task.

20 Claims, 6 Drawing Sheets

(56) References Cited

U.S. PATENT DOCUMENTS

| | | | |
|---|---|---|---|
| 2018/0314450 A1 | 11/2018 | Qiu et al. | |
| 2018/0321879 A1* | 11/2018 | Lu | G06F 3/06 |
| 2019/0272123 A1 | 9/2019 | Gissin et al. | |
| 2020/0133791 A1* | 4/2020 | Liu | G06F 16/13 |
| 2021/0271650 A1* | 9/2021 | Wang | G06F 16/174 |

FOREIGN PATENT DOCUMENTS

| | | | | |
|---|---|---|---|---|
| CN | 108369530 A | | 8/2018 | |
| CN | 109213772 A | | 1/2019 | |
| CN | 110888827 A | | 3/2020 | |
| EP | 0138675 A2 | | 4/1985 | |
| WO | WO-2020236275 A1 | * | 11/2020 | G06F 12/0862 |

* cited by examiner

METADATA PROCESSING METHOD TO IMPROVE DATA READ/WRITE EFFICIENCY OF A STORAGE DEVICE

CROSS-REFERENCE TO RELATED APPLICATIONS

This is a continuation of International Patent Application No. PCT/CN2021/094646 filed on May 19, 2021, which claims priority to Chinese Patent Application No. 202010739813.8 filed on Jul. 28, 2020 and Chinese Patent Application No. 202010526832.2 filed on Jun. 11, 2020, all of which are hereby incorporated by reference in their entireties.

TECHNICAL FIELD

Embodiments of this application relate to the field of storage technologies, and in particular, to a metadata processing method in a storage device, and a related device.

BACKGROUND

For data stored in a storage device, metadata of the data is further configured to ensure data query. The metadata is used to indicate a storage location of the data. When data is written, metadata of the data usually needs to be written at the same time. When the data is read, the metadata of the data needs to be obtained first, to read the data based on the metadata. Therefore, in a process of reading or writing data, how to process metadata affects read/write efficiency of the storage device to some extent.

SUMMARY

Embodiments of this application provide a metadata processing method in a storage device and a related device, to improve data read/write efficiency of the storage device. The technical solution is as follows.

According to a first aspect, a metadata processing method in a storage device is provided. In the method, a network interface card in the storage device receives an input/output (I/O) request, where the I/O request includes a data read request or a data write request. The network interface card executes a metadata processing task corresponding to the I/O request. When the network interface card determines that the metadata processing task fails to be executed, the network interface card requests a central processing unit (CPU) in the storage device to execute the metadata processing task.

In this embodiment of this application, to reduce data processing pressure of the CPU, when receiving the I/O request, the network interface card does not directly transfer the I/O request to the CPU. Instead, the network interface card first executes the metadata processing task. When the network interface card fails to execute the metadata processing task, the network interface card requests the CPU to execute the metadata processing task. This can prevent metadata processing tasks corresponding to the I/O request from being executed all by the network interface card or executed all by the CPU. Therefore, the storage device may adaptively offload some metadata processing tasks from the CPU to the network interface card such that data processing pressure of the CPU can be reduced, and an excessive delay due to metadata processing by the network interface card can be further avoided. Accordingly, data read/write efficiency of the storage device is improved.

Based on the method provided in the first aspect, in a possible implementation, the network interface card includes a memory, and a case in which the metadata processing task fails to be executed includes that the memory of the network interface card is insufficient to provide a memory resource required by the metadata processing task.

In a process in which the network interface card executes the metadata processing task, when an available memory of the network interface card is insufficient to provide a memory required by the metadata processing task, the network interface card may determine that the metadata processing task fails to be executed. In this way, in the process of executing the metadata processing task, the network interface card may quickly determine whether the metadata processing task fails to be executed such that flexibility of executing the metadata processing task is improved.

Based on the method provided in the first aspect, in a possible implementation, when the I/O request is a data read request, a case in which the metadata processing task fails to be executed includes than an address length of a logical address carried in the data read request exceeds a length threshold.

In a data read request scenario, if the network interface card directly reads data whose address length of the logical address exceeds the length threshold, the network interface card needs to interact for a plurality of times to read the data. Consequently, it takes a long time for the network interface card to read the data. Therefore, in this embodiment of this application, if the address length of the logical address carried in the data read request exceeds the length threshold, the CPU is requested to execute the metadata processing task, to improve efficiency of reading data whose address length of the logical address exceeds the length threshold.

Based on the method provided in the first aspect, in a possible implementation, the storage device includes a first index library and a second index library, and a data amount of metadata stored in the first index library is less than a data amount of metadata stored in the second index library. In this scenario, when the IO request is a data read request, a case in which the metadata processing task fails to be executed includes that the network interface card fails to obtain, from the first index library, metadata corresponding to the data read request. In this case, that the network interface card requests the CPU in the storage device to execute the metadata processing task includes that the network interface card indicates the CPU to obtain, from the second index library, the metadata corresponding to the data read request.

In addition, an amount of data that needs to be processed when the metadata is obtained from the first index library is less than an amount of data that needs to be processed when the metadata is obtained from the second index library. Therefore, in this embodiment of this application, the network interface card may first obtain the metadata from the first index library, and when the network interface card fails to obtain the metadata from the first index library, the CPU obtains the metadata from the second index library such that metadata obtaining efficiency is improved.

Based on the method provided in the first aspect, in a possible implementation, the first index library includes metadata of hotspot data, and the second index library includes metadata of non-hotspot data.

The first index library includes the metadata of the hotspot data. The hotspot data is data with high access frequency. Therefore, separately storing the metadata of the hotspot data in one index library can improve efficiency of reading the metadata of the hotspot data.

Based on the method provided in the first aspect, in a possible implementation, when the I/O request is a data write request, the metadata processing task is storing metadata corresponding to the data write request.

Based on the method provided in the first aspect, in a possible implementation, when the I/O request is a data read request, the metadata processing task is obtaining the metadata corresponding to the data read request.

In this embodiment of this application, in different I/O requests, the metadata processing task has different operations that need to be performed.

Based on the method provided in the first aspect, in a possible implementation, metadata corresponding to the I/O request is used to indicate a storage location of data corresponding to the I/O request.

In this embodiment of this application, the metadata corresponding to the I/O request includes information related to the storage location of the data such that in a data read scenario, the network interface card can obtain, based on the index library, the information related to the storage location of the data. In this way, the network interface card can bypass the CPU to read the data, and efficiency of reading data by the storage device is improved.

Based on the method provided in the first aspect, in a possible implementation, the metadata includes a key-value pair, a key in the key-value pair indicates a logical address of the data corresponding to the I/O request, and a value in the key-value pair indicates a physical address of the data corresponding to the I/O request.

A correspondence between the logical address and the physical address of the data may be stored in the metadata by using the foregoing key-value pair, to implement a technical effect that the network interface card can obtain, based on the index library, the information related to the storage location of the data. In this way, the network interface card can bypass the CPU to read the data, and efficiency of reading data by the storage device is improved.

Based on the method provided in the first aspect, in a possible implementation, the metadata includes a key-value pair, a key in the key-value pair indicates a logical address of the data corresponding to the I/O request, and a value in the key-value pair indicates fingerprint information of the data corresponding to the I/O request.

The physical address of the data may continue to be obtained through query by using the fingerprint information of the data. Therefore, in the foregoing manner, a technical effect that the network interface card can obtain, based on the index library, the information related to the storage location of the data can also be implemented. In this way, the network interface card can bypass the CPU to read the data, and efficiency of reading data by the storage device is improved.

Based on the method provided in the first aspect, in a possible implementation, the storage device is a storage array or a storage node in a distributed storage system. The method provided in this embodiment of this application may be applied to a single storage device, or may be applied to a storage node in the distributed storage system.

According to a second aspect, a metadata processing method in a storage device is provided. In the method, a network interface card in the storage device receives a plurality of I/O requests, where the I/O request includes a data read request or a data write request. When the network interface card determines that a quantity of the I/O requests exceeds a specified quantity threshold, requesting, by the network interface card, a CPU in the storage device to process a metadata processing task corresponding to at least one of the plurality of I/O requests.

In this embodiment of this application, an execution result of a currently to-be-processed metadata execution task may be predetermined based on a quantity of I/O requests. When the quantity of I/O requests exceeds a specific quantity, it is predetermined that the network interface card cannot successfully execute the metadata processing task. In this case, the CPU may be requested to execute the metadata processing task. This improves flexibility of metadata processing, and may further enable the network interface card and the CPU to adaptively and dynamically execute the metadata processing task. The at least one I/O request may be some or all of the plurality of I/O requests. In this way, some metadata processing tasks may be adaptively offloaded from the CPU to the network interface card such that data processing pressure of the CPU can be reduced, and an excessive delay due to metadata processing by the network interface card can be further avoided. Accordingly, data read/write efficiency of the storage device is improved.

After the quantity of I/O requests exceeds a specific quantity, the CPU may process all the I/O requests; or the CPU may process some I/O requests, and the network interface card processes the remaining I/O requests such that flexibility of metadata processing is improved.

Based on the method provided in the second aspect, in a possible implementation, when the I/O request is a data write request, the metadata processing task is storing metadata corresponding to the data write request.

Based on the method provided in the second aspect, in a possible implementation, when the I/O request is a data read request, the metadata processing task is obtaining metadata corresponding to the data read request.

Based on the method provided in the second aspect, in a possible implementation, metadata corresponding to the I/O request is used to indicate a storage location of data corresponding to the I/O request.

Based on the method provided in the second aspect, in a possible implementation, the metadata includes a key-value pair, a key in the key-value pair indicates a logical address of the data corresponding to the I/O request, and a value in the key-value pair indicates a physical address of the data corresponding to the I/O request.

Based on the method provided in the second aspect, in a possible implementation, the metadata includes a key-value pair, a key in the key-value pair indicates a logical address of the data corresponding to the I/O request, and a value in the key-value pair indicates fingerprint information of the data corresponding to the I/O request.

Based on the method provided in the second aspect, in a possible implementation, the storage device is a storage array or a storage node in a distributed storage system.

For beneficial effects of the related explanations of the foregoing metadata, refer to the technical effects of the related implementations in the metadata processing method provided in the first aspect. Details are not described herein again.

According to a third aspect, a metadata processing apparatus is provided. The metadata processing apparatus has a function of implementing the metadata processing method according to the first aspect. The metadata processing apparatus includes at least one module, and the at least one module is configured to implement the metadata processing method provided in the first aspect.

According to a fourth aspect, a metadata processing apparatus is provided. The metadata processing apparatus has a function of implementing the metadata processing method according to the second aspect. The metadata processing apparatus includes at least one module, and the at least one module is configured to implement the metadata processing method provided in the second aspect.

According to a fifth aspect, a network interface card is provided, where the network interface card includes a communication interface and a processor. The communication interface is configured to communicate with a CPU in a storage device, and the processor is configured to implement a function of the method according to the first aspect or the second aspect.

According to a sixth aspect, a storage device is provided, where the storage device includes a network interface card and a CPU.

The network interface card is configured to receive an I/O request, execute a metadata processing task corresponding to the I/O request, and when the network interface card determines that the metadata processing task fails to be executed, request the CPU to execute the metadata processing task, where the I/O request includes a data read request or a data write request.

The CPU is configured to execute the metadata processing task based on the request from the network interface card.

For a specific implementation, refer to the implementation of the metadata processing method in the storage device provided in the first aspect. Details are not described herein again.

The network interface card includes a memory, and a case in which the metadata processing task fails to be executed includes that the memory of the network interface card is insufficient to provide a memory resource required by the metadata processing task.

Based on the storage device provided in the sixth aspect, in a possible implementation, when the I/O request is a data read request, a case in which the metadata processing task fails to be executed includes that an address length of a logical address carried in the data read request exceeds a length threshold.

Based on the storage device provided in the sixth aspect, in a possible implementation, the storage device includes a first index library and a second index library; a data amount of metadata stored in the first index library is less than a data amount of metadata stored in the second index library; and when the I/O request is a data read request, a case in which the metadata processing task fails to be executed includes that the network interface card fails to obtain, from the first index library, metadata corresponding to the data read request; and that the network interface card requests a CPU in the storage device to execute the metadata processing task includes: the network interface card indicates the CPU to obtain, from the second index library, the metadata corresponding to the data read request.

Based on the storage device provided in the sixth aspect, in a possible implementation, the first index library includes metadata of hotspot data, and the second index library includes metadata of non-hotspot data.

Based on the storage device provided in the sixth aspect, in a possible implementation, when the I/O request is a data write request, the metadata processing task is storing metadata corresponding to the data write request.

Based on the storage device provided in the sixth aspect, in a possible implementation, when the I/O request is a data read request, the metadata processing task is obtaining the metadata corresponding to the data read request.

Based on the storage device provided in the sixth aspect, in a possible implementation, metadata corresponding to the I/O request is used to indicate a storage location of data corresponding to the I/O request.

Based on the storage device provided in the sixth aspect, in a possible implementation, the metadata includes a key-value pair, a key in the key-value pair is used to indicate a logical address of the data corresponding to the I/O request, and a value in the key-value pair is used to indicate a physical address of the data corresponding to the I/O request.

Based on the storage device provided in the sixth aspect, in a possible implementation, the metadata includes a key-value pair, a key in the key-value pair is used to indicate a logical address of the data corresponding to the I/O request, and a value in the key-value pair is used to indicate fingerprint information of the data corresponding to the I/O request.

Based on the storage device provided in the sixth aspect, in a possible implementation, the storage device is a storage array or a storage node in a distributed storage system.

According to a seventh aspect, a storage device is provided, where the storage device includes a network interface card and a CPU.

The network interface card is configured to receive a plurality of I/O requests, and when the network interface card determines that a quantity of the I/O requests exceeds a specified quantity threshold, request the CPU to process a metadata processing task corresponding to at least one of the plurality of I/O requests.

The CPU is configured to, based on the request from the network interface card, execute the metadata processing task corresponding to the at least one I/O request.

For a specific implementation, refer to the implementation of the metadata processing method in the storage device provided in the second aspect. Details are not described herein again.

Based on the storage device provided in the seventh aspect, in a possible implementation, the at least one I/O request is all of the plurality of I/O requests.

Based on the storage device provided in the seventh aspect, in a possible implementation, the at least one I/O request is a subset of the plurality of I/O requests, and the network interface card is further configured to execute a metadata processing task corresponding to the rest of the plurality of I/O requests other than the at least one I/O request.

Based on the storage device provided in the seventh aspect, in a possible implementation, when the I/O request is a data write request, the metadata processing task is storing metadata corresponding to the data write request.

Based on the storage device provided in the seventh aspect, in a possible implementation, when the I/O request is a data read request, the metadata processing task is obtaining metadata corresponding to the data read request.

Based on the storage device provided in the seventh aspect, in a possible implementation, metadata corresponding to the I/O request is used to indicate a storage location of data corresponding to the I/O request.

Based on the storage device provided in the seventh aspect, in a possible implementation, the metadata includes a key-value pair, a key in the key-value pair indicates a logical address of the data corresponding to the I/O request, and a value in the key-value pair is used to indicate a physical address of the data corresponding to the I/O request.

Based on the storage device provided in the seventh aspect, in a possible implementation, the metadata includes a key-value pair, a key in the key-value pair is used to indicate a logical address of the data corresponding to the I/O request, and a value in the key-value pair is used to indicate fingerprint information of the data corresponding to the I/O request.

According to an eighth aspect, a computer-readable storage medium is provided. The computer-readable storage medium stores instructions, and when the instructions are run on a computer, the computer is enabled to perform the metadata processing method according to the first aspect or the second aspect.

According to a ninth aspect, a computer program product including instructions is provided. When the computer program product runs on a computer, the computer is enabled to perform the metadata processing method according to the first aspect or the second aspect.

Technical effects obtained in the third aspect to the ninth aspect are similar to the technical effects obtained by using corresponding technical means in the first aspect or the second aspect. Details are not described herein again.

DESCRIPTION OF EMBODIMENTS

To make the objectives, technical solutions, and advantages of embodiments of this application clearer, the following further describes the implementations of this application in detail with reference to the accompanying drawings.

Before embodiments of this application are explained and described in detail, an application scenario of embodiments of this application is first explained and described.

Performance of an index library in a storage system greatly affects overall performance of the storage system. The index library is used to store metadata, and usually stores the metadata by using a specific data structure. The metadata is data that describes various attributes of data. The metadata includes a mapping relationship between a logical address and a physical address of the data, or another piece of information that describes a storage location of the data and describes a relationship between various pieces of data. The logical address is an address presented to an upper-layer application, and the physical address is used to indicate a specified location in which the data is stored in a storage medium. During data reading, usually, a logical address of to-be-read data can be obtained only from a data read request. In this case, a physical address corresponding to the logical address needs to be obtained from the index library, and the data needs to be obtained from space indicated by the physical address. When data is written, the physical address of the data and a mapping relationship between the physical address and the logical address need to be stored in the index library, to be used when the data is read next time.

It can be learned that when performing data access (data access refers to reading data or writing data), the storage system accesses the index library at the same time. The metadata processing method provided in embodiments of this application is applied to the foregoing scenario in which the index library is accessed.

Figure 1:
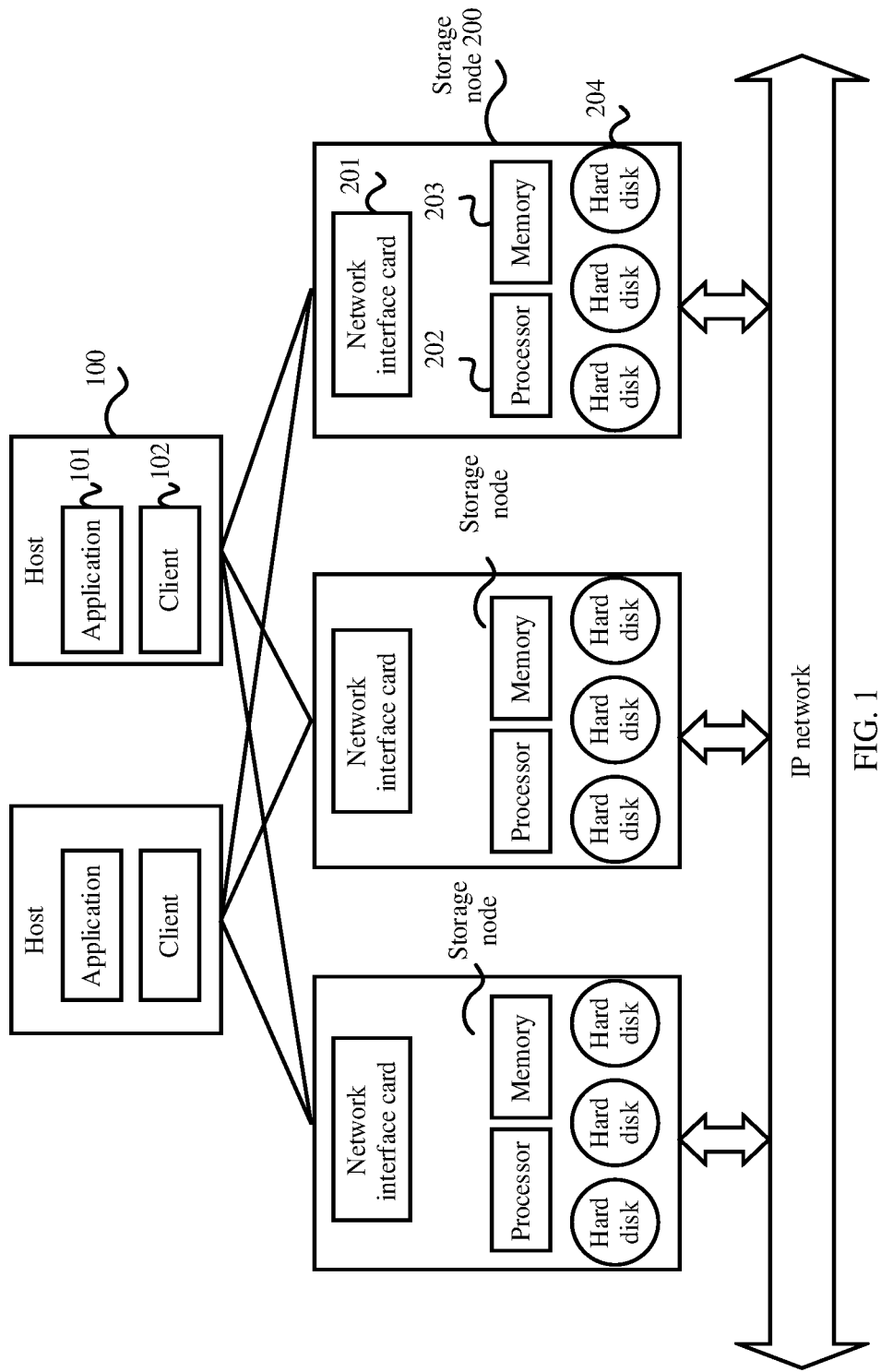
FIG. 1 is a schematic diagram of an architecture of a storage system according to an embodiment of this application.

The following explains and describes an architecture of a storage system in embodiments of this application. As shown in FIG. 1, a storage system provided in this embodiment includes a host cluster and a storage node cluster.

The host cluster includes one or more hosts 100 (FIG. 1 shows two hosts 100, but is not limited to the two hosts 100). The host 100 is a computing device on a user side, for example, a server or a desktop computer. An application 101 and a client 102 are run on the host 100. The application 101 is a general term of various applications presented to a user. The client 102 is configured to receive an I/O request triggered by the application 101, interact with a storage node 200, and send the I/O request to the storage node 200. The client 102 is further configured to receive data from a storage node, and forward the data to the application 101. Alternatively, the client 102 may be implemented by a hardware component that is located inside the host 100. It may be understood that when the client 102 is a software program, a function of the client 102 is implemented by a processor included in the host 100 by running the program. Any client 102 in the host cluster may access any storage node 200 in the storage node cluster through a network.

The storage node cluster includes one or more storage nodes 200 (FIG. 1 shows three storage nodes 200, but is not limited to the three storage nodes 200). All storage nodes 200 may be interconnected to each other through an internet protocol (IP) network or another network. The storage node 200 is a storage device, for example, a server or a controller of a storage array. In terms of hardware, as shown in FIG. 1, the storage node 200 includes at least a processor 202, a memory 203, a network interface card 201, and a hard disk 204.

The processor 202 is a CPU, and is configured to process an I/O request from outside the storage node 200 or a request generated inside the storage node 200.

The memory 203 is configured to temporarily store data received from the host 100 or data read internally. When receiving a plurality of data write requests sent by the host 100, the storage node 200 may temporarily store data that is in the plurality of data write requests in the memory 203. When a total amount of data in the memory 203 reaches a specific threshold, the data stored in the memory 203 is flushed to the hard disk 204 for storage. The memory 203 includes a volatile memory, for example, a random-access memory (RAM). The memory 203 may have a power protection function. The power protection function means that the data stored in the memory 203 is not lost when a system is powered off and then powered on again. Generally, a memory having a power protection function is referred to as a non-volatile memory.

It should be noted that the memory 203 may be a memory of the storage node. Alternatively, the memory 203 may be a memory allocated from a global memory pool for the storage node to use. The global memory pool is pre-created on each storage node, and storage space of the global memory pool is provided by a memory on each storage node or provided by another storage. When using the memory, each storage node may apply to the global memory pool for a part of storage space as a memory of the storage node.

The network interface card 201 is configured to communicate with the host 100. Further, the storage node 200 may receive a request from the host 100 by using the network interface card 201, or send a request to the host 100 by using the network interface card 201.

The hard disk 204 is configured to store data, and may be a magnetic disk or a storage medium of another type, for example, a solid state disk or a shingled magnetic recording hard disk. It should be noted that a hard disk in the storage system shown in FIG. 1 may be a hard disk inside the storage node. Optionally, the hard disk may alternatively be a hard disk on another storage device externally connected to the storage node. In this case, in terms of functions, the storage node 200 is mainly configured to perform calculation or storage on data. The calculation performed on the data mainly includes metadata management, data deduplication, storage space virtualization, address translation, and the like.

Metadata management may refer to reading, writing, or updating metadata from an index library. For example, the metadata is stored in the index library or the metadata is read from the index library. Data deduplication means that during data storage, if a storage node already stores data that is the same as to-be-stored data, the storage node does not store the data. Whether there is same data is determined by using fingerprint information of the data. The fingerprint information is used to uniquely identify the data. The fingerprint information may be stored in a database of the storage node. For example, when an index library is deployed on the storage node, the database may be the index library on the storage node. Optionally, the database may alternatively be another database independent of the index library.

Storage space virtualization means that storage space provided by a hard disk is virtualized into a logical unit, to provide a logical address that can be sensed by a host. Address translation means translating a logical address into a physical address or translating a physical address into a logical address.

In addition, the storage node 200 may further include a bus (not shown in FIG. 1), and the bus is used for communication between components inside the storage node 200.

Figure 2:
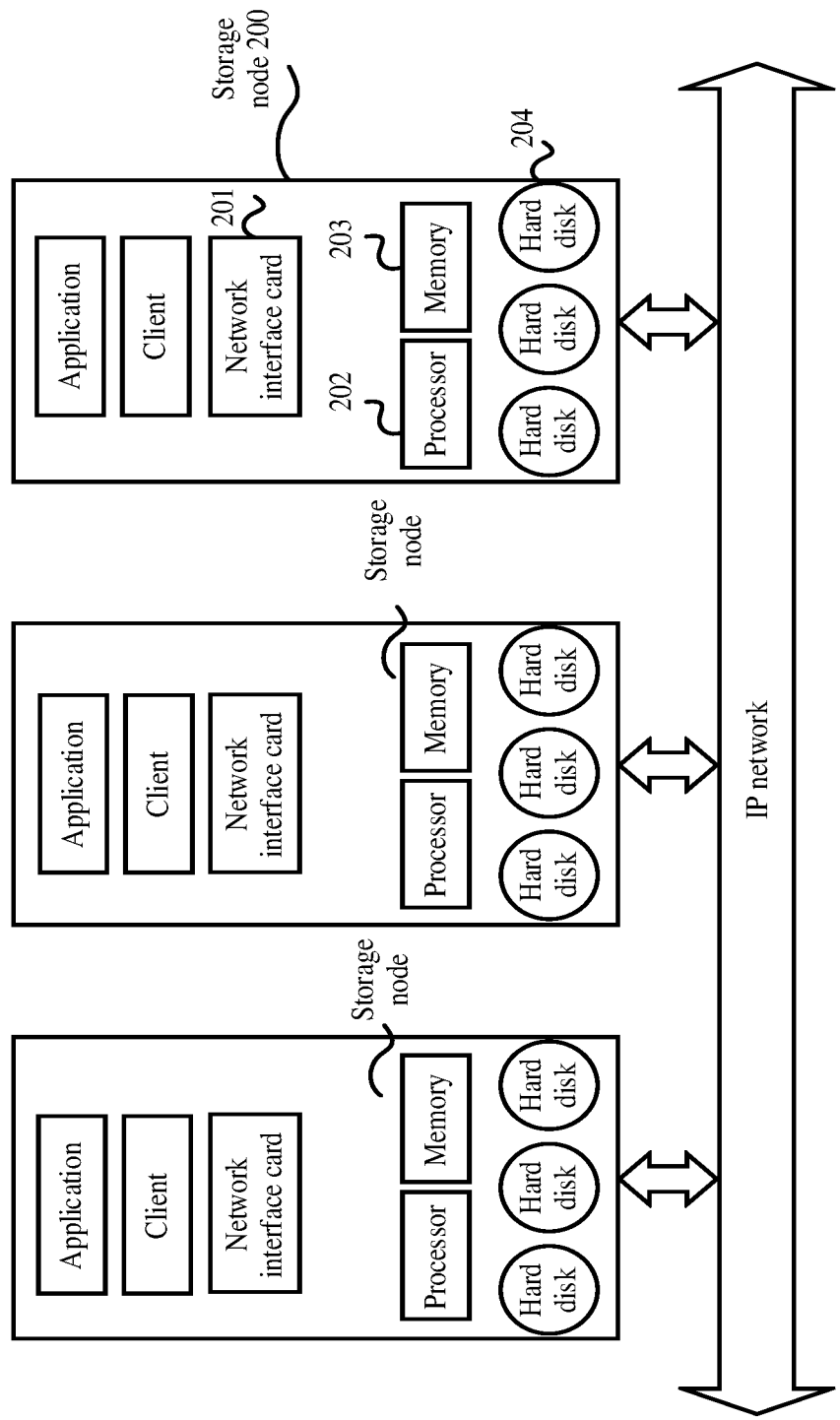
FIG. 2 is a schematic diagram of an architecture of another storage system according to an embodiment of this application.

For a network architecture of another storage system provided in this embodiment, refer to FIG. 2. As shown in FIG. 2, in this network architecture, an application 101 and a client 102 are deployed inside a storage node 200. Therefore, the application 101 may directly trigger an I/O request (the I/O request in this embodiment includes a data write request or a data read request) by using the client 102 in the storage node 200, and the I/O request is processed by the storage node 200, or is sent to another storage node 200 for processing. In this case, that the client 102 sends the I/O request to the storage node 200 specifically means that the client 102 sends the I/O request to the processor 202. For the network architecture shown in FIG. 2, if a hard disk in FIG. 2 is a hard disk inside the storage node 200, the I/O request does not need to pass through another network when reaching a hard disk 204 from the client 102. If a hard disk in FIG. 2 is a hard disk on another storage device externally connected to the storage node 200, the I/O request needs to pass through one hop of network (between the storage node and another storage device in which the hard disk is located) when reaching the hard disk 204 from the client 102. However, in the network architecture shown in FIG. 1, an I/O request needs to pass through at least one hop of network (a network between a host and a storage node) when reaching the hard disk 204 from the client 102. In addition, components included in the storage node 200 and functions of the components are similar to those of the storage node 200 in FIG. 1. Details are not described herein again.

For the storage system shown in FIG. 1 or FIG. 2, an index library may be deployed on each storage node. In this case, the index library is used to store metadata of data stored on a corresponding storage node. This scenario of deploying an index library may be referred to as a distributed deployment index library. In the distributed deployment index library, an index library on each storage node may be deployed in a memory of the storage node, or may be deployed on a hard disk of the storage node.

Optionally, an index library may further be deployed, in a centralized manner, on a storage node in the storage system, and the index library is used to store metadata of all data stored in the storage system. This scenario of deploying an index library may be referred to as a centralized deployment index library. In the centralized deployment index library, the centrally-deployed index library may be deployed in a memory of the storage node, or may be deployed on a hard disk of the storage node.

In addition, considering that hotspot data in the storage system is frequently used data, metadata of the hotspot data may be separately stored in an index library. Metadata of data other than the hotspot data is stored, or both metadata of the hotspot data and metadata of data other than the hotspot data are stored, in another index library. The hotspot data refers to data whose access frequency is greater than a popularity threshold. An access frequency in this embodiment of this application may be determined by using a quantity of times of accessing data in a specified time period. In this way, index libraries provided in this embodiment of this application may be classified into a first index library and a second index library. The first index library stores the metadata of the hotspot data. The second index library stores the metadata of the hotspot data and metadata of non-hotspot data, or the second index library stores metadata of non-hotspot data other than the hotspot data. For example, the metadata in the first index library may be stored in a hash table manner. The metadata in the second index library may be stored in a tree structure. In this case, the first index library may alternatively be referred to as a hash table index library, and the second index library may alternatively be referred to as a tree structure index library.

When the index libraries include the first index library and the second index library, if metadata needs to be queried from the index libraries, the metadata may be first queried from the first index library. If the metadata is not found in the first index library, the metadata is queried from the second index library. In this way, that the metadata is directly queried from the full index library is avoided such that efficiency of querying the metadata is improved.

In addition, the index library may store information from metadata of a piece of data in a key-value pair manner. For example, when metadata corresponding to an I/O request is used to indicate a storage location of data corresponding to the I/O request, a key in the key-value pair indicates a logical address of the data, and a value in the key-value pair indicates a physical address of the data. In this case, the key-value pair is used to store a mapping relationship between the logical address and the physical address of the data. Optionally, a key in the key-value pair indicates the logical address of the data, and a value in the key-value pair indicates fingerprint information of the data. The fingerprint information has been described above. Details are not described herein again. The physical address of the data may continue to be found by using the fingerprint information.

The foregoing describes a storage manner of the metadata in the index library by using a key-value pair as an example. Optionally, the metadata in the index library may alternatively be stored in another manner. Examples are not described one by one herein.

In addition, if index libraries deployed on a storage node include the first index library and the second index library, the first index library may be stored in a memory of the storage node, and the second index library is stored in a hard disk of the storage node. Optionally, both the first index library and the second index library may be stored in the memory of the storage node, or both may be stored in the hard disk of the storage node. Specific storage locations of the first index library and the second index library are not limited in this embodiment of this application.

In addition, the storage system shown in FIG. 1 or FIG. 2 further includes a storage pool. The storage pool is used to provide storage space, and the storage space comes from the hard disk 204 in the storage node 200.

An actual address of the storage space provided by the hard disk 204 is not directly exposed to the storage node 200 or the host 100. In actual application, some or all hard disks 204 included in each storage node 200 form the storage pool. Each hard disk 204 is divided into several chunks, and a plurality of chunks from different hard disks 204 or different storage nodes 200 form one storage object. A storage object is a minimum allocation unit of a storage pool. When a storage node applies for storage space from the storage pool, the storage pool may provide one or more storage objects for the storage node. The storage node further virtualizes the storage space provided by the storage object into logical units (LU) for the host 100 to use. Each logical unit has a unique logical unit number (LUN). Since the host 100 can directly sense the logical unit number, a person skilled in the art usually directly uses the LUN to refer to the logical unit. Each LUN has a LUN identifier (ID), and the LUN ID is used to identify the LUN. A specific location of data in a LUN may be determined by a start address and a length of the data. The start address is usually referred to as a logical block address (LBA) by a person skilled in the art. It may be understood that three factors, namely, a LUN ID, an LBA, and a length, identify a determined address segment. A data read request generated by the host 100 usually carries a LUN ID, an LBA, and a length. The three factors may be referred to as a logical address of data.

In addition, the storage system shown in FIG. 1 or FIG. 2 belongs to a distributed deployment scenario. In the distributed deployment scenario of the storage system, the storage system includes a plurality of storage nodes. Optionally, embodiments of this application may also be applied to a centralized storage scenario. For example, the metadata processing method in embodiments of this application is implemented inside a single storage array or a single storage node. A storage array is a combination of at least one controller and a plurality of hard disks, and the method may be executed by the controller. The single storage node may be any storage node 200 shown in FIG. 1 or FIG. 2.

The foregoing content is used to explain and describe the network architecture of the storage system in embodiments of this application. The following explains and describes in detail a metadata processing method provided in embodiments of this application.

Figure 3:
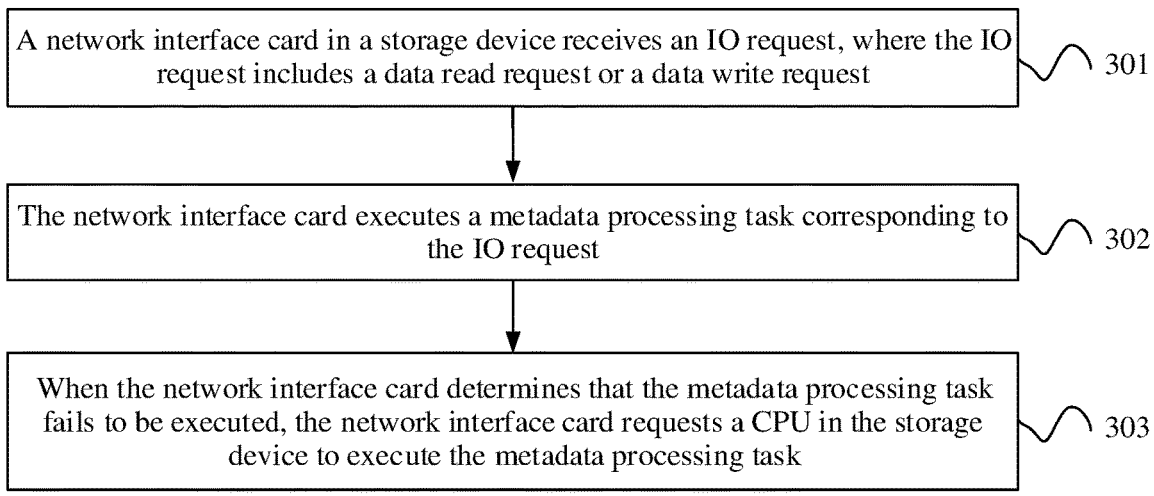
FIG. 3 is a flowchart of a metadata processing method in a storage device according to an embodiment of this application.

FIG. 3 is a flowchart of a metadata processing method in a storage device according to an embodiment of this application. The storage device may be any storage node in FIG. 1 or FIG. 2. As shown in FIG. 3, the method includes the following several steps.

Step 301: A network interface card in the storage device receives an IO request, where the IO request includes a data read request or a data write request.

The I/O request is a data access request sent by a client in the host shown in FIG. 1 or FIG. 2. For the storage system shown in FIG. 1 or FIG. 2, a client obtains a corresponding storage node through calculation based on an address of data that needs to be accessed by the I/O request and a preset algorithm, and sends the I/O request to the corresponding storage node. For the scenario shown in FIG. 1, the client in the host sends the I/O request to a network interface card in the storage node. When receiving the I/O request, the network interface card processes the I/O request by using the method provided in this embodiment of this application. For the scenario shown in FIG. 2, the client in the host still sends the I/O request to a network interface card in the storage node. The network interface card uniformly processes the I/O request by using the method provided in this embodiment of this application.

In addition, when the IO request is a data write request, the data write request includes to-be-stored data and a logical address of the to-be-stored data. The logical address of the to-be-stored data includes a LUN ID, an LBA, and a length. Operations that need to be performed by the storage device include storing, in the storage device, data corresponding to the data write request, and storing, in an index library, a correspondence between the logical address of the data and a physical address of the data. When the I/O request is a data read request, the data read request includes a logical address of to-be-read data. Operations that need to be performed by the storage device includes obtaining, from the index library, a physical address corresponding to the logical address carried in the data read request, and reading data based on the obtained physical address.

When the correspondence between the logical address of the data and the physical address of the data uses a key-value pair manner, and the I/O request is a data write request, the storage device needs to store a key-value pair in the index library. When the I/O request is a data read request, the storage device needs to obtain a key-value pair from the index library.

In addition, the network interface card may receive a large quantity of I/O requests in a short time period, and the network interface card needs to use specific duration to process each I/O request. Therefore, after receiving an I/O request, the network interface card may further add the I/O request to a task queue. The I/O requests are processed in sequence by using the following steps according to a sequence in the task queue.

Step 302: The network interface card executes a metadata processing task corresponding to the IO request.

In this embodiment of this application, the metadata processing task is a task of querying or modifying metadata of data corresponding to the I/O request. For example, when the I/O request is a data write request, the metadata processing task corresponding to the I/O request is storing metadata corresponding to the data write request into the index library, to complete update of the index library. The metadata corresponding to the data write request includes a physical address of to-be-stored data or a mapping relationship between the physical address and a logical address, or other address index information. When the I/O request is a data read request, the metadata processing task corresponding to the I/O request is querying the index library, to obtain metadata corresponding to the data read request. For example, a physical address corresponding to a logical address that is carried in the data read request is obtained.

The network interface card needs to use a specific memory resource to execute the metadata processing task, and the memory resource mainly comes from a memory included in the network interface card. Therefore, in a possible implementation, the network interface card may determine an execution status of the metadata processing task based on an available memory resource. Specifically, the network interface card determines the memory resource required for executing the metadata processing task. When the available memory of the network interface card is insufficient to provide the required memory resource, the network interface card determines that the metadata processing task fails to be executed. When the available memory of the network interface card is sufficient to provide the required memory resource, the network interface card executes the metadata processing task. In other words, in this embodiment of this application, a case in which the metadata processing task fails to be executed includes that the memory of the network interface card is insufficient to provide the memory resource required by the metadata processing task.

The foregoing available memory resource of the network interface card refers to remaining space in the memory of the network interface card. In addition, in addition to the memory of the network interface card, the memory resource of the network interface card may further include a part of memory allocated from the shared memory pool to the network interface card for use. This is not specifically limited in this embodiment of this application. The shared memory pool has been described in the system architectures shown in FIG. 1 and FIG. 2. Details are not described herein again.

In addition, an I/O request usually has a delay requirement. Therefore, in another possible implementation, after receiving the I/O request, the network interface card executes the metadata processing task, and determines, in an execution process in real time, duration that has been spent in executing the metadata processing task. If the duration exceeds a delay threshold, the network interface card determines that the metadata processing task fails to be executed.

The foregoing duration threshold is set duration, and the duration threshold may be set by an administrator based on performance of the network interface card.

In the foregoing implementation, after receiving the I/O request, the network interface card directly executes the metadata processing task, and collects statistics on duration that has been spent in executing the metadata processing task. After the duration that has been spent exceeds the duration threshold, the network interface card does not continue to execute the metadata processing task. Instead, execution of the metadata processing task is completed by using the following step 303.

It should be noted that the foregoing implementation of determining, based on the memory resource or a delay, whether the metadata processing task fails to be executed may be applied to a data read request, or may be applied to a data write request. In addition, the network interface card may alternatively determine, in another manner, whether the metadata processing task fails to be executed. Examples are not described one by one herein again.

Step 303: When the network interface card determines that the metadata processing task fails to be executed, the network interface card requests a CPU in the storage device to execute the metadata processing task.

It can be learned based on step 302 that an execution result that is obtained by the network interface card and that is of the metadata processing task is obtained by the network interface card in a process of executing the metadata processing task. Therefore, requesting the CPU to execute the metadata processing task may be requesting the CPU to re-execute the metadata processing task, or may be requesting the CPU to execute a remaining metadata processing task that is not completed by the network interface card.

An implementation in which the network interface card requests the CPU to execute the metadata processing task may be as follows. The network interface card sends a task execution request to the CPU. The task execution request indicates the CPU to execute the metadata processing task corresponding to the I/O request. When receiving the task execution request, the CPU may execute the metadata processing task. The task execution request may carry an identifier of the I/O request such that the CPU directly executes, based on the identifier of the I/O request, the metadata processing task corresponding to the I/O request. In addition, the task execution request may further carry information used to indicate an execution progress of the metadata processing task executed by the network interface card such that the CPU directly continues to execute, based on the identifier of the I/O request and the execution progress of the metadata processing task, the remaining metadata processing task that is not completed by the network interface card.

It should be noted that, when a metadata processing task is executed, if operations such as updating and querying an index library are completed by using the CPU, an advantage is that a complex index library can be processed. However, these processing operations cause CPU scheduling overheads at the same time, which increases an access delay. In another manner, the index library is accessed by using a processing capability (for example, one-sided remote direct memory access (one-sided RDMA)) of a high-performance network interface card. However, the network interface card cannot process an excessively complex index library. In addition, a processing efficiency is also limited. Therefore, the network interface card needs to interact with a network for a plurality of times to process the index library, and the performance is negatively affected.

Therefore, in this embodiment of this application, to reduce data processing pressure of the CPU, when receiving the I/O request, the network interface card does not directly transfer the I/O request to the CPU. Instead, the network interface card first obtains the execution result of the metadata processing task. If the execution result is that the metadata processing task fails to be executed, the network interface card requests the CPU to execute the metadata processing task corresponding to the I/O request. This can prevent metadata processing tasks corresponding to the I/O request from being executed all by the network interface card or executed all by the CPU. Therefore, the storage device may adaptively offload some metadata processing tasks from the CPU to the network interface card such that data processing pressure of the CPU can be reduced, and an excessive delay due to metadata processing by the network interface card can be further avoided.

In the embodiment shown in FIG. 3, the network interface card determines, in the process of executing the metadata processing task, whether the metadata processing task fails to be executed. Optionally, in this embodiment of this application, the network interface card may further predetermine an execution result of the metadata processing task before executing the metadata processing task. If it is predicted that the metadata processing task fails to be executed, the network interface card requests the CPU to process the metadata processing task.

Figure 4:
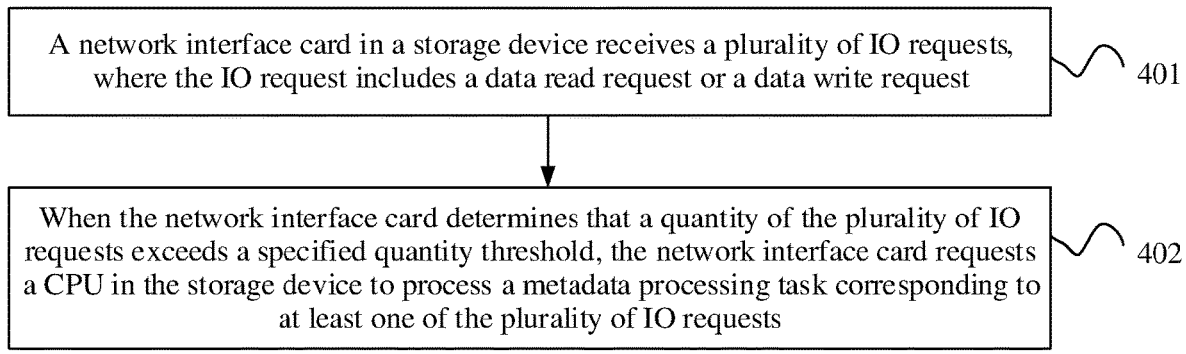
FIG. 4 is a flowchart of another metadata processing method in a storage device according to an embodiment of this application.

An embodiment shown in FIG. 4 is used to explain and describe such a predetermining case. As shown in FIG. 4, the metadata processing method in the storage device includes the following several steps.

Step 401: A network interface card in the storage device receives a plurality of I/O requests, where the I/O request includes a data read request or a data write request.

For explanations and descriptions of step 401, refer to the explanations and descriptions of step 301 in the embodiment in FIG. 3. Details are not described herein again.

Step 402: When the network interface card determines that a quantity of the plurality of I/O requests exceeds a specified quantity threshold, the network interface card requests a CPU in the storage device to process a metadata processing task corresponding to at least one of the plurality of IO requests.

When the quantity of the plurality of received I/O requests exceeds the quantity threshold, a large amount of data needs to be processed for executing metadata processing tasks corresponding to these I/O requests is large. Accordingly, long duration is required for executing the metadata processing tasks corresponding to these I/O requests. Therefore, to avoid a large delay generated when the network interface card directly executes the metadata processing tasks corresponding to these I/O requests, the network interface card may request the CPU to process the I/O requests. In other words, the network interface card directly determines, based on the quantity of received I/O requests, whether the network interface card executes the metadata processing task or the CPU executes the metadata processing task.

An implementation in which the network interface card requests the CPU to execute the metadata processing task corresponding to the at least one I/O request may be as follows. The network interface card sends a task execution request to the CPU. The task execution request indicates the CPU to execute the metadata processing task corresponding to the at least one I/O request. When receiving the task execution request, the CPU may execute the metadata processing task corresponding to the at least one I/O request.

In a possible implementation, in step 402, the network interface card may request the CPU to process all I/O requests in the plurality of I/O requests. In this case, the at least one I/O request in step 402 is all of the plurality of I/O requests in step 401.

In a possible implementation, in step 402, the network interface card may request the CPU to process some of the plurality of I/O requests, and the network interface card processes the other I/O requests. In this case, the at least one I/O request in step 402 is a subset of the plurality of I/O requests. In this implementation, the network interface card executes a metadata processing task corresponding to the rest of the plurality of I/O requests other than the at least one I/O request in step 401.

When the network interface card requests the CPU to process some of the plurality of I/O requests, the network interface card may determine, based on a currently available memory of the network interface card, a quantity of I/O requests that can be processed by the network interface card. Then, another I/O request beyond the quantity is used as the at least one I/O request. For the available memory of the network interface card, refer to the related explanations in the embodiment shown in FIG. 3. Details are not described herein again.

It should be noted that the embodiment shown in FIG. 4 may be applied to a data read request, or may be applied to a data write request. In addition, for explanations of the metadata processing task in the embodiment shown in FIG. 4, refer to the explanations of related content in the embodiment in FIG. 3. Details are not described herein again.

It can be learned that, in this embodiment of this application, an execution result of a currently to-be-processed metadata execution task may be predetermined based on a quantity of I/O requests. When the quantity of I/O requests exceeds a specific quantity, it is predetermined that the network interface card cannot successfully execute the metadata processing task. In this case, the CPU is requested to execute the metadata processing task. The foregoing predetermining manner improves flexibility of metadata processing, and may further enable the network interface card and the CPU to adaptively and dynamically execute the metadata processing task. In this way, some metadata processing tasks may be adaptively offloaded from the CPU to the network interface card, so that data processing pressure of the CPU can be reduced, and an excessive delay due to metadata processing by the network interface card can be further avoided. Accordingly, data read/write efficiency of the storage device is improved.

In addition, in the embodiment shown in FIG. 4, the execution result of the currently to-be-processed metadata execution task is predetermined based on the quantity of I/O requests. Optionally, for any I/O request, the network interface card may further estimate duration of executing a metadata processing task corresponding to the I/O request. If the duration exceeds a delay threshold, the network interface card determines that the metadata processing task fails to be executed. Further, the network interface card requests the CPU to execute the metadata processing task.

The duration for executing the metadata processing task is duration that is required for executing the metadata processing task and that is pre-estimated by the network interface card. In other words, the network interface card estimates duration before actually executing the metadata processing task, and determines, based on the estimated duration, whether the metadata processing task is executed by the network interface card or the CPU. The network interface card may obtain a length extended from a queue head to the I/O request in a task queue to which the I/O request is added and average processing duration of each I/O request. The network interface estimates, based on the two pieces of information, duration required for processing the I/O request.

Optionally, the network interface card may alternatively predetermine, in another manner, whether the network interface card executes the metadata processing task or the CPU executes the metadata processing task. Examples are not described one by one herein again.

Both the embodiments shown in FIG. 3 and FIG. 4 may be applied to a scenario in which an I/O request is a data write request, or applied to a scenario in which an I/O request is a data read request. The following explains and describes, again, the metadata processing method provided in embodiments of this application by using separate examples in which an I/O request is a data write request and a data read request.

Figure 5:
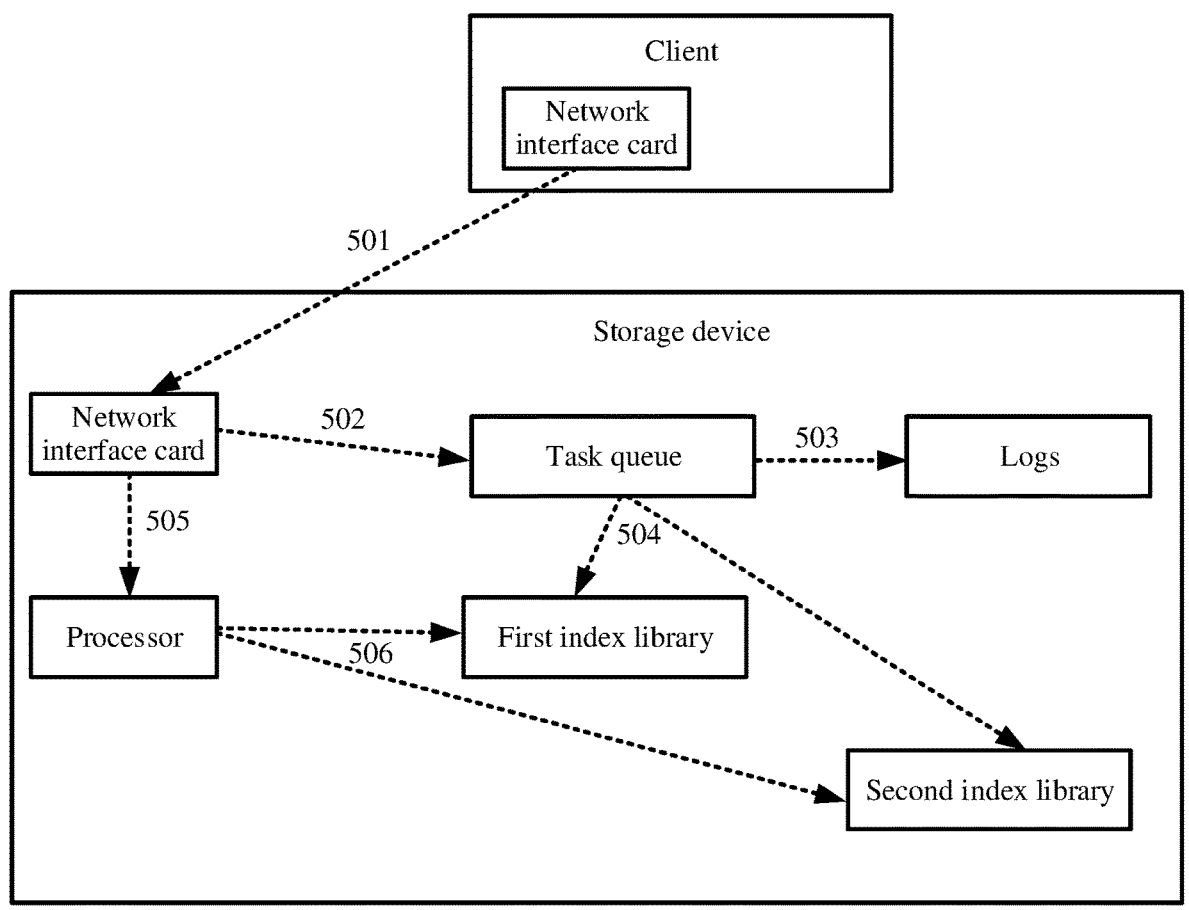
FIG. 5 is a flowchart of still another metadata processing method in a storage device according to an embodiment of this application.

FIG. 5 is a schematic flowchart of a metadata processing method in a data write scenario according to an embodiment of this application. As shown in FIG. 5, the method includes the following several steps.

Step 501: A client sends a data write request to a network interface card of a storage node via a network interface card, where the data write request indicates to store data and update metadata corresponding to the data in an index library.

Step 502: The network interface card of the storage node places the data write request in a task queue controlled by the network interface card, and the network interface card executes data write requests in the task queue according to a sequence in the task queue.

When an I/O request is a data write request, before executing a metadata processing task, the network interface card first stores, by using the following step 503, to-be-stored data that is in the data write request, and executes the metadata processing task based on a physical address of the to-be-stored data by using the following step 504. The physical address of the to-be-stored data may be obtained by the client from the storage node in advance. How the client determines the physical address of the to-be-stored data is not limited in this embodiment of this application.

Step 503: The network interface card writes the to-be-stored data.

In this embodiment of this application, the network interface card may write the to-be-stored data in a write-ahead logging (WAL) manner.

A write-ahead log is a technology used to ensure data integrity. Simply speaking, before a data write request is actually executed, a to-be-performed data write operation is recorded. The record is a log, and data is cached in a memory. If the data is modified subsequently, all modification records are also stored in the log. The log is persistently stored into a hard disk. After the log is stored successfully, an operation of storing the data that is in the memory into the hard disk is performed. During a storage process, no matter in which step an error occurs, the log stored in the hard disk can be replayed, to obtain a correct result. In actual application, a data amount of to-be-stored data carried in a data write request is usually large, operations are cumbersome, and data is not necessarily written in sequence. Therefore, if a next operation can be performed only after a result of each operation is written onto the hard disk, efficiency is very low. In the write-ahead logging manner, a data amount of the log is very small and the logs are written in sequence. Therefore, write efficiency can be increased. Generally, the logs include but are not limited to: the to-be-stored data (the to-be-stored data included in the logs is in a different format from the to-be-stored data described above), a time point at which the to-be-stored data is received, a corresponding operation type (for example, write instructions or read instructions), an access address of the to-be-stored data, or the like.

The data write request is executed in the write-ahead logging manner. A log is written first, and then data is written. Data stored in a memory in the storage device may be accumulated to a specific extent and then flushed to the hard disk at a time. In this way, a quantity of times of writing data to the hard disk of the storage node can be reduced, and network resources are saved. In addition, the log is persistently stored in the hard disk before the data is stored in the hard disk. Therefore, even if a fault occurs during data storage, the data can be restored by replaying the log.

It should be noted that the foregoing WAL manner is merely a possible implementation in which the network interface card writes the to-be-stored data. An implementation in which the network interface card writes the to-be-stored data is not limited in this embodiment of this application.

In addition, the to-be-stored data may be stored in the foregoing global memory pool and persisted by using a non-volatile medium. A mapping relationship between the physical address and a logical address that are included in the metadata of the to-be-stored data may be stored in a key-value pair manner. In this case, encoded content in a value in the key-value pair may be a physical address of the global memory pool, so that the network interface card can bypass the CPU to directly read the physical address of the data when subsequently processing the data read request. Therefore, data read efficiency is improved.

Step 504: The network interface card determines a memory resource required for updating the index library. When an available memory of the network interface card is sufficient to provide the memory resource required in the update process, the network interface card executes the metadata processing task.

That the network interface card executes the metadata processing task means that the network interface card stores the metadata of the data into the index library, to complete update of the index library. In this case, the data write request sent by the client is successfully processed.

When the index library includes a first index library and a second index library, that the network interface card executes the metadata processing task specifically includes the following three implementations.

In a first possible implementation, if metadata of hotspot data is stored in the first index library, and metadata of non-hotspot data other than the hotspot data is stored in the second index library, that the network interface card executes the metadata processing task means that the network interface card updates only the first index library. Subsequently, after the CPU determines, based on a data eviction algorithm, that the data is non-hotspot data, the metadata of the data may be migrated to the second index library, and the metadata is deleted from the first index library.

In a second possible implementation, if metadata of hotspot data is stored in the first index library, and metadata of the hotspot data and metadata of non-hotspot data are stored in the second index library, that the network interface card executes the metadata processing task means that only the first index library may be updated. The CPU stores the metadata into the second index library at the same time in the background, to complete update of the second index library. After the metadata is stored in the second index library, the metadata in the first index library is not deleted.

In a third possible implementation, if metadata of hotspot data is stored in the first index library, and metadata of the hotspot data and metadata of non-hotspot data are stored in the second index library, that the network interface card executes the metadata processing task means that the network interface card may update the first index library and the second index library at the same time.

In addition, an implementation in which the network interface card determines whether the available memory is sufficient to provide the memory resource required for executing the metadata processing task may be as follows. The network interface card determines metadata that needs to be stored in the index library, and then determines whether a memory needs to be reallocated to the index library such that the metadata can be stored. If a memory needs to be reallocated to the index library such that the metadata can be stored, it is determined that the memory of the network interface card is insufficient to provide the required memory resource. If a memory does not need to be reallocated to the index library, and the network interface card can also store the metadata in the index library, it is determined that the memory of the network interface card is sufficient to provide the required memory resource.

Step 505: If a process of updating the index library is complex, and as a result, the available memory of the network interface card cannot meet the memory resource required by the update process, the network interface card delivers the metadata processing task to the CPU for processing, and the CPU completes update of the metadata in the index library. At the same time, the network interface card identifies a task about the data in a task queue as being processed by the CPU, and a request that is about the same data and that arrives later is queued in the task queue and is not processed temporarily. The update request that is about the same data and that arrives later starts to be processed only after the CPU completes processing. However, an I/O request of other data that is not processed by the CPU is still processed by the network interface card by using the foregoing step 501 to step 504, and does not need to wait.

In step 505, that the CPU completes the update of the metadata in the index library means that the CPU may execute the entire metadata processing task. In other words, the CPU stores the metadata of the to-be-stored data in the index library, to complete the update of the index library.

In this case, when the index library includes the first index library and the second index library, for an implementation in which the CPU executes the metadata processing task, refer to the implementation in which the network interface card executes the metadata processing task in step 505. Details are not described herein again.

Optionally, that the CPU completes the update of the metadata in the index library in step 505 means that the CPU may complete a task remained in a process in which the network interface card executes the metadata processing task. Details are not described herein again.

Step 506: The CPU processes a complex index library update operation, to complete the update of the index library. In this case, the data write request sent by the client is successfully processed. In addition, the network interface card further marks a data-related task in the task queue as having been processed by the CPU.

In conclusion, in this embodiment of this application, to reduce data processing pressure of the CPU, when receiving the data write request, the network interface card of the storage node does not directly transfer the data write request to the CPU. Instead, the network interface card first predetermines an execution result of the metadata processing task corresponding to the data write request. If the execution result is that the metadata processing task fails to be executed, the network interface card requests the CPU to execute the metadata processing task corresponding to the write request. This can prevent metadata processing tasks corresponding to the write request from being executed all by the network interface card or executed all by the CPU. It can be learned that this embodiment of this application provides a method in which a network interface card and a CPU adaptively and dynamically execute a metadata processing task. In this way, some metadata processing tasks may be adaptively offloaded from the CPU to the network interface card, so that data processing pressure of the CPU can be reduced, and an excessive delay due to metadata processing by the network interface card can be further avoided.

It should be noted that the embodiment shown in FIG. 5 is described by using an example in which the network interface card determines, based on the memory resource, the execution result of the metadata processing task corresponding to the data write request. Optionally, the network interface card may further determine the execution result of the metadata processing task based on another implementation. For a specific implementation, refer to the embodiment shown in FIG. 3. Details are not described herein again.

Figure 6:
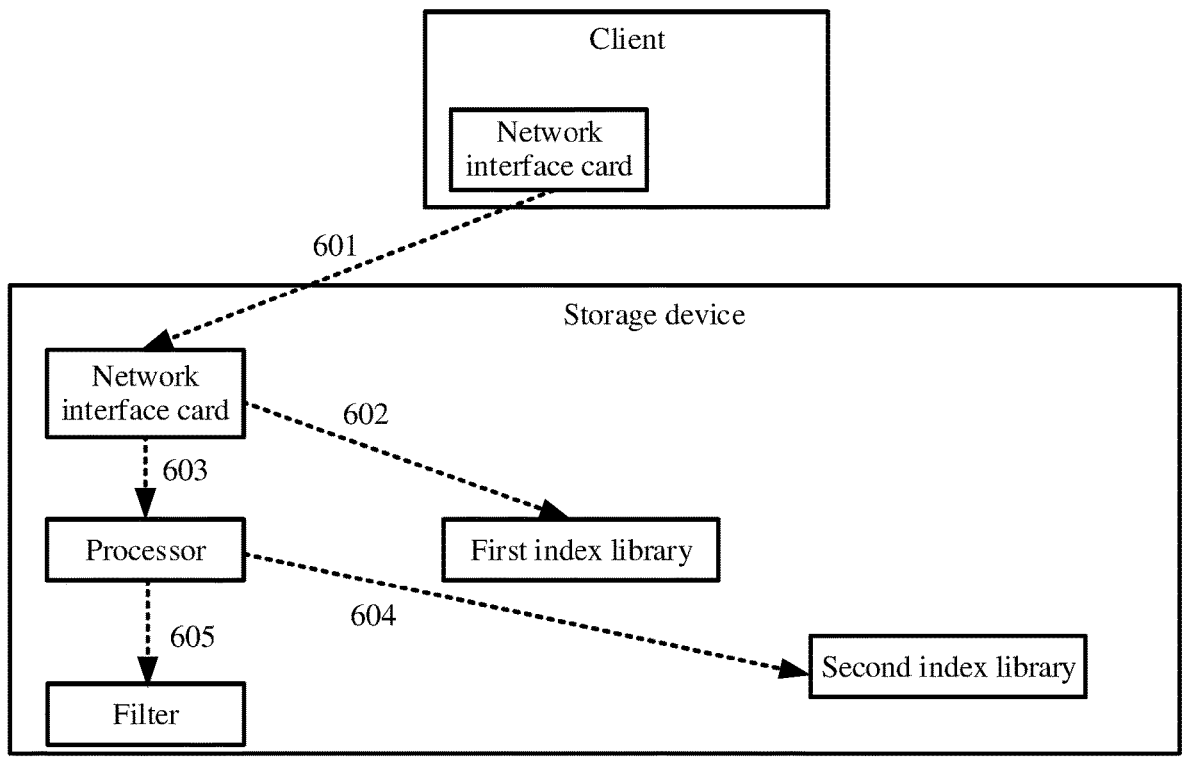
FIG. 6 is a flowchart of yet another metadata processing method in a storage device according to an embodiment of this application.

FIG. 6 is a schematic flowchart of a metadata processing method in a data read scenario according to an embodiment of this application. As shown in FIG. 6, the method includes the following several steps.

Step 601: A client sends a data read request to a network interface card of a storage node via a network interface card, where the data read request indicates to read data at a logical address or indicates to read data at a large range of logical addresses.

When an I/O request is a data read request, in addition to determining, by using the memory resource or the delay in step 302 in the embodiment shown in FIG. 3, whether the metadata processing task fails to be executed, an execution result of a metadata processing task may be further determined based on an address length of a logical address carried in the data read request. For example, when the address length of the logical address carried in the data read request exceeds a length threshold, to avoid a case in which the network interface card needs to interact for a plurality of times to obtain to-be-read data, the data read request may be processed by the CPU. In other words, when the address length of the logical address carried in the data read request exceeds the length threshold, the network interface card determines that the metadata processing task corresponding to the data read request fails to be executed. When the address length of the logical address carried in the data read request is less than the length threshold, the network interface card may execute the metadata processing task. Then, the network interface card continues to determine, based on an actual metadata processing execution status, whether to request the CPU to execute the metadata processing task.

The following step 602 and step 603 are used to explain and describe the foregoing content.

Step 602: When the address length of the logical address carried in the data read request is less than the length threshold, the network interface card executes the metadata processing task.

When an index library includes the first index library and the second index library described above, it can be learned, based on the foregoing explanations for the first index library and the second index library, that a data amount of metadata stored in the second index library is greater than a data amount of metadata in the first index library. Accordingly, a resource amount consumed for obtaining the metadata from the second index library is greater than a resource amount consumed for obtaining the metadata from the first index library. Therefore, an implementation in which the network interface card executes the metadata processing task may be as follows: The network interface card obtains, from the first index library, a physical address corresponding to the logical address carried in the data read request; and if the physical address corresponding to the logical address carried in the data read request is not found in the first index library, the network interface card determines that the metadata processing task fails to be executed. In this case, step 603 is used to request the CPU to execute the metadata processing task.

The foregoing length threshold may be a difference between two adjacent logical addresses, or may be a specified length. This is not limited in this embodiment of this application.

For example, when the data read request indicates to read data in a logical address area, the network interface card may first execute, in the first index library, the metadata processing task corresponding to the data read request. If the metadata processing task fails to be executed, the following step 603 is used to request the CPU to execute the metadata processing task in the second index library.

Step 603: When the network interface card receives the data read request, and the address length of the logical address carried in the data read request exceeds the length threshold, the network interface card determines that the metadata processing task fails to be executed. In this case, the network interface card requests the CPU to execute the metadata processing task. Alternatively, when the network interface card does not successfully execute the metadata processing task in the first index library in step 602, the network interface card also requests the CPU to execute the metadata processing task.

In other words, in step 603, there are two scenarios in which the CPU needs to execute the metadata processing task. A first scenario is as follows. The address length of the logical address carried in the data read request is less than the length threshold, but the network interface card does not find metadata of to-be-read data in the first index library. A second scenario is as follows: The address length of the logical address carried in the data read request exceeds the length threshold.

In the foregoing first scenario, the network interface card has queried the first index library for the metadata, and a query result is that the metadata is not found. Therefore, that the CPU executes the metadata processing task means that the CPU obtains the metadata of the to-be-read data from the second index library.

In the foregoing second scenario, if metadata of hotspot data is stored in the first index library, and metadata of data other than the hotspot data is stored in the second index library, that the CPU executes the metadata processing task means that the CPU may obtain the metadata of the to-be-read data from the first index library and the second index library.

In addition, in the foregoing second scenario, if metadata of hotspot data is stored in the first index library, and the metadata of the hotspot data and metadata of non-hotspot data are stored in the second index library, that the CPU executes the metadata processing task means that the CPU may obtain the metadata of the to-be-read data from the second index library. This brings about a technical effect that the CPU can be prevented from repeatedly querying the first index library for the metadata.

Step 604: The CPU executes the metadata processing task, to complete query work in the index library, and the data read request sent by the client is successfully processed.

In step 604, the CPU may separately query the index library by using the different scenarios shown in step 603.

Step 605: If the CPU cannot find, in the index library, the physical address corresponding to the logical address carried in the data request, the CPU continues to query a filter; and if the filter indicates that the logical address is not at a lower-performance storage tier, a data read failure message is returned; or if the filter does not indicate that the logical address is not at a lower-performance storage tier, the CPU continues to query a low-performance storage tier for the data corresponding to the logical address.

To further improve data read efficiency, a storage system may store some rarely accessed data into the lower-performance storage tier. The lower-performance storage tier may be some or all of storage space in the hard disk shown in FIG. 1 or FIG. 2. Metadata of data at the lower-performance storage tier is not stored in the index library. Instead, a filter is configured for the lower-performance storage tier. The filter is used to query whether data is stored in the lower-performance storage tier.

Therefore, in step 605, if the CPU does not find, in the index library, the physical address corresponding to the logical address carried in the data read request, the CPU continues to perform the query by using the filter. If the CPU finds, by using the filter, that the to-be-read data is stored in the lower-performance storage tier, the CPU reads the data from the lower-performance storage tier. If the to-be-read data still cannot be found by using the filter, the CPU returns the data reading failure message to the client.

In addition, it should be noted that, in the embodiment shown in FIG. 6, when the address length of the logical address carried in the data read request is less than the length threshold, the network interface card may execute the metadata processing task based on the first index library. Then, the network interface card determines, based on an execution result in the first index library, whether to request the CPU to execute the metadata processing task in the second index library. Optionally, the network interface card may not consider the address length of the logical address carried in the data read request. The network interface card first executes the metadata processing task based on the first index library. Then, the network interface card determines, based on an execution result of the metadata processing task, whether to request the CPU to execute the metadata processing task in the second index library. Details are not described herein again.

Figure 7:
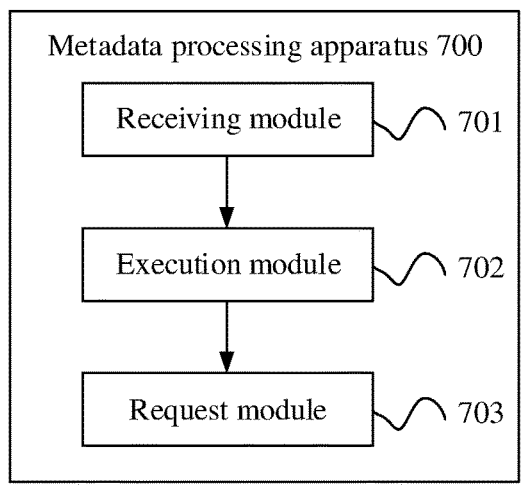
FIG. 7 is a schematic diagram of a metadata processing apparatus according to an embodiment of this application.

FIG. 7 shows a metadata processing apparatus according to an embodiment of this application. The apparatus is deployed in a network interface card of a storage system. As shown in FIG. 7, the apparatus 700 includes the following components.

A receiving module 701 is configured to receive an I/O request, where the I/O request includes a data read request or a data write request. For a specific implementation process, refer to step 301 in the embodiment in FIG. 3.

An execution module 702 is configured to execute a metadata processing task corresponding to the IO request. For a specific implementation process, refer to step 302 in the embodiment in FIG. 3.

A request module 703 is configured to: when it is determined that the metadata processing task fails to be executed, request a central processing unit CPU in a storage device to execute the metadata processing task. For a specific implementation process, refer to step 303 in the embodiment in FIG. 3.

It should be noted that the network interface card shown in FIG. 1 or FIG. 2 may include a communication interface used for communication and a component having a processing function, for example, a processor (not shown in FIG. 1 or FIG. 2). In this case, the receiving module 701 and the request module 703 in FIG. 7 may be implemented by the communication interface on the network interface card in FIG. 1 or FIG. 2. The execution module 702 in FIG. 7 may be implemented by the component that has a processing function and that is on the network interface card in FIG. 1 or FIG. 2. Optionally, all the modules shown in FIG. 7 may be implemented by the component that has a processing function and that is on the network interface card. This is not specifically limited in this embodiment of this application.

Optionally, the network interface card includes a memory, and a case in which the metadata processing task fails to be executed includes: The memory of the network interface card is insufficient to provide a memory resource required by the metadata processing task.

Optionally, when the I/O request is a data read request, a case in which the metadata processing task fails to be executed includes that an address length of a logical address carried in the data read request exceeds a length threshold.

Optionally, when the I/O request is a data read request, the storage device includes a first index library and a second index library, and a data amount of metadata stored in the first index library is less than a data amount of metadata stored in the second index library. A case in which the metadata processing task fails to be executed includes that the network interface card fails to obtain, from the first index library, metadata corresponding to the data read request. That the network interface card requests a CPU in the storage device to execute the metadata processing task includes that the network interface card indicates the CPU to obtain, from the second index library, the metadata corresponding to the data read request.

Optionally, the first index library includes metadata of hotspot data, and the second index library includes metadata of non-hotspot data.

Optionally, when the I/O request is a data write request, the metadata processing task is storing metadata corresponding to the data write request.

Optionally, when the I/O request is a data read request, the metadata processing task is obtaining metadata corresponding to the data read request.

Optionally, metadata corresponding to the I/O request is used to indicate a storage location of data corresponding to the I/O request.

Optionally, the metadata includes a key-value pair, a key in the key-value pair indicates a logical address of the data corresponding to the I/O request, and a value in the key-value pair indicates a physical address of the data corresponding to the I/O request.

Optionally, the metadata includes a key-value pair, a key in the key-value pair indicates a logical address of the data corresponding to the I/O request, and a value in the key-value pair indicates fingerprint information of the data corresponding to the I/O request.

Optionally, the storage device is a storage array or a storage node in a distributed storage system.

In this embodiment of this application, to reduce data processing pressure of the CPU, when receiving the I/O request, the network interface card does not directly transfer the I/O request to the CPU. Instead, the network interface card first executes the metadata processing task. If the metadata processing task fails to be executed, the network interface card requests the CPU to execute the metadata processing task corresponding to the I/O request. This can prevent metadata processing tasks corresponding to the I/O request from being executed all by the network interface card or executed all by the CPU. Therefore, the storage device may adaptively offload some metadata processing tasks from the CPU to the network interface card such that data processing pressure of the CPU can be reduced, and an excessive delay due to metadata processing by the network interface card can be further avoided.

It should be noted that when the metadata processing apparatus provided in the foregoing embodiment processes metadata, division of the foregoing functional modules is merely used as an example for description. In actual application, the foregoing functions may be allocated to different functional modules for implementation based on a requirement. In other words, an internal structure of the device is divided into different functional modules, to complete all or some of the functions described above. In addition, the metadata processing apparatus provided in the foregoing embodiment shares a same concept with the metadata processing method embodiment. For a specific implementation process of the metadata processing apparatus, refer to the method embodiment. Details are not described herein again.

Figure 8:
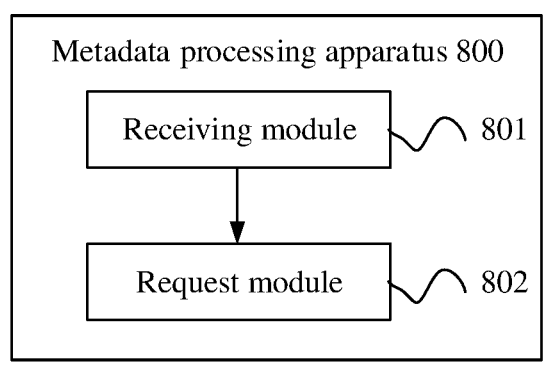
FIG. 8 is a schematic diagram of another metadata processing apparatus according to an embodiment of this application.

FIG. 8 shows a metadata processing apparatus according to an embodiment of this application. The apparatus is deployed in a network interface card of a storage system. As shown in FIG. 8, the apparatus 800 includes the following components.

A receiving module 801 is configured to receive a plurality of I/O request, where the I/O request includes a data read request or a data write request. For a specific implementation, refer to step 401 in the embodiment in FIG. 4.

A request module 802 is configured to: when it is determined that a quantity of the I/O requests exceeds a specified quantity threshold, request a central processing unit in a storage device to process a metadata processing task corresponding to at least one of the plurality of I/O requests. For a specific implementation, refer to step 402 in the embodiment in FIG. 4.

It should be noted that the network interface card shown in FIG. 1 or FIG. 2 may include an interface used for communication and a component having a processing function, for example, a processor (not shown in FIG. 1 or FIG. 2). In this case, the receiving module 801 and the request module 802 in FIG. 8 may be implemented by the communication interface on the network interface card in FIG. 1 or FIG. 2. Optionally, the receiving module 801 and the request module 802 may alternatively be implemented by another component that has a processing function and that is on the network interface card. This is not specifically limited in this embodiment of this application.

Optionally, the at least one I/O request is all of the plurality of I/O requests.

Optionally, the at least one I/O request is a subset of the plurality of I/O requests, and the apparatus further includes: an execution module, configured to execute a metadata processing task corresponding to the rest of the plurality of I/O requests other than the at least one I/O request.

Optionally, metadata corresponding to the I/O request is used to indicate a storage location of data corresponding to the I/O request.

Optionally, the metadata includes a key-value pair, a key in the key-value pair indicates a logical address of the data corresponding to the I/O request, and a value in the key-value pair indicates a physical address of the data corresponding to the I/O request.

Optionally, the metadata includes a key-value pair, a key in the key-value pair indicates a logical address of the data corresponding to the I/O request, and a value in the key-value pair indicates fingerprint information of the data corresponding to the I/O request.

Optionally, the storage device is a storage array or a storage node in a distributed storage system.

In this embodiment of this application, an execution result of a currently to-be-processed metadata execution task may be predetermined based on a quantity of I/O requests. When the quantity of I/O requests exceeds a specific quantity, it is predetermined that the network interface card cannot successfully execute the metadata processing task. In this case, the CPU may be requested to execute the metadata processing task. This improves flexibility of metadata processing, and may further enable the network interface card and the CPU to adaptively and dynamically execute the metadata processing task. In this way, some metadata processing tasks may be adaptively offloaded from the CPU to the network interface card, so that data processing pressure of the CPU can be reduced, and an excessive delay due to metadata processing by the network interface card can be further avoided. Accordingly, data read/write efficiency of the storage device is improved.

It should be noted that when the metadata processing apparatus provided in the foregoing embodiment processes metadata, division of the foregoing functional modules is merely used as an example for description. In actual application, the foregoing functions may be allocated to different functional modules for implementation based on a requirement. In other words, an internal structure of the device is divided into different functional modules, to complete all or some of the functions described above. In addition, the metadata processing apparatus provided in the foregoing embodiment shares a same concept with the metadata processing method embodiment. For a specific implementation process of the metadata processing apparatus, refer to the method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the processes or the functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some steps for implementing the foregoing embodiments may be implemented by hardware or a program instructing relevant hardware. The program may be stored in a computer-readable storage medium. The storage medium may include a read-only memory, a magnetic disk, or an optical disc.

The foregoing descriptions are embodiments provided in this application, but are not intended to limit this application. Any modification, equivalent replacement, or improvement made without departing from the spirit and principle of this application shall fall within the protection scope of this application.

What is claimed is:

1. A method implemented by a network interface card in a storage device, wherein the method comprises:
   receiving an input/output (I/O) request comprising a data read request or a data write request;
   making an attempt to execute a metadata processing task corresponding to the I/O request, wherein an address length of a logical address in the data read request exceeds a length threshold when the attempt fails; and
   requesting, in response to the attempt failing and the I/O request being the data read request, a central processing unit (CPU) in the storage device to execute the metadata processing task.

2. The method of claim 1, wherein the network interface card comprises a memory, and wherein the memory is insufficient to provide a memory resource for the metadata processing task when the attempt fails.

3. The method of claim 1, wherein the storage device comprises a first index library comprising a first data amount of metadata and a second index library comprising a second data amount of metadata, wherein the first data amount is less than the second data amount, wherein the network interface card fails to obtain, from the first index library, first metadata corresponding to the data read request when the I/O request is the data read request and the attempt fails, and wherein the requesting comprises obtaining, from the second index library by the CPU, the first metadata.

4. The method of claim 3, wherein the first index library comprises second metadata of hotspot data, and wherein the second index library comprises third metadata of non-hotspot data.

5. The method of claim 1, wherein the metadata processing task comprises metadata corresponding to the data write request when the I/O request is the data write request.

6. The method of claim 1, wherein the metadata processing task is obtaining metadata corresponding to the data read request when the I/O request is the data read request.

7. The method of claim 1, wherein metadata corresponding to the I/O request indicates a storage location of data corresponding to the I/O request.

8. The method of claim 7, wherein the metadata comprises a key-value pair, and wherein the key-value pair comprises a key indicating a logical address of the data and a value indicating a physical address of the data.

9. The method of claim 7, wherein the metadata comprises a key-value pair, and wherein the key-value pair comprises a key indicating a logical address of the data and a value indicating fingerprint information of the data.

10. A storage device comprising:
    a network interface card configured to:
      receive an input/output (I/O) request comprising a data read request or a data write request;
      make an attempt to execute a metadata processing task corresponding to the I/O request, wherein an address length of a logical address in the data read request exceeds a length threshold when the attempt fails; and
      request, in response to the attempt failing and the I/O request being the data read request, to execute the metadata processing task; and
    a central processing unit (CPU) coupled to the network interface card and configured to execute the metadata processing task based on the I/O request.

11. The storage device of claim 10, wherein the network interface card comprises a memory, and wherein the memory is insufficient to provide a memory resource for the metadata processing task when the attempt fails.

12. The storage device of claim 10, wherein the storage device comprises a first index library comprising a first data amount of metadata and a second index library comprising a second data amount of metadata, wherein the first data amount is less than the second data amount, wherein the network interface card fails to obtain, from the first index library, first metadata corresponding to the data read request when the I/O request is the data read request and the attempt fails, and wherein the network interface card is further configured to indicate the CPU to obtain, from the second index library, the first metadata.

13. The storage device of claim 12, wherein the first index library comprises second metadata of hotspot data, and wherein the second index library comprises third metadata of non-hotspot data.

14. The storage device of claim 10, wherein the metadata processing task comprises metadata corresponding to the data write request when the I/O request is the data write request.

15. The storage device of claim 10, wherein the metadata processing task is obtaining metadata corresponding to the data read request when the I/O request is the data read request.

16. The storage device of claim 10, wherein metadata corresponding to the I/O request indicates a storage location of data corresponding to the I/O request.

17. The storage device of claim 16, wherein the metadata comprises a key-value pair, and wherein the key-value pair comprises a key indicating a logical address of the data and a value indicating a physical address of the data.

18. A computer program product comprising computer-executable instructions that are stored on non-transitory computer-readable storage medium and that, when executed by a processor, cause a network interface card in a storage device to:
  receive an input/output (I/O) request comprising a data read request or a data write request;
  make an attempt to execute a metadata processing task corresponding to the I/O request, wherein an address length of a logical address in the data read request exceeds a length threshold when the attempt fails; and
  request, in response to the attempt failing and the I/O request being the data read request, a central processing unit (CPU) in the storage device to execute the metadata processing task.

19. The computer program product of claim 18, wherein the metadata processing task comprises metadata corresponding to the data write request when the I/O request is the data write request.

20. The computer program product of claim 18, wherein the metadata processing task is obtaining metadata corresponding to the data read request when the I/O request is the data read request.

* * * * *